United States Patent Office 3,290,556
Patented Dec. 6, 1966

3,290,556
OVERCURRENT STATIC RELAY
John M. Graham, Minneapolis, Minn., and Richard J. Wondra, West Allis, and Gerard M. Larose, Milwaukee, Wis., assignors to Allis-Chalmers Manufacturing Company, Milwaukee, Wis.
Filed Jan. 21, 1963, Ser. No. 252,984
3 Claims. (Cl. 317—36)

This invention relates to static relays, particularly static relays that are utilized to provide sensing of overcurrents in a power electrical system and deenergize the load when the current or time-current conditions exceed a predetermined level.

With the development of electronic components, such as transistors and diodes, the static relay has begun to replace the older mechanical relays. The advantages of static relays opened the way to more adequate protection of power sources or loads deriving their energy from electrical power sources.

However, many problems are present in the design and development of the static relays. There is an overriding necessity to give characteristic responses that conform to responses of other protective systems within a power system and that conform to the characteristics of the equipment to be protected. The deenergization of loads should not occur when not necessary and should not occur in circuits (through pyramiding protective systems) other than the one developing the fault condition.

The static relay of this invention enables varying selection of time-current and current responses and can be utilized in systems that use other types of protective devices. It components can also be appropriately selected and adjusted so that desired protection of many types of loads may be obtained.

An object of this invention is to provide new and improved static relays.

Another object of this invention is to provide static relays that are versatile in application.

Another object of this invention is to provide static relays that are readily externally adjustable between predetermined ranges.

Another object of this invention is to provide static relays that utilize a current generator means or constant current source for input signal energy.

Another object of this invention is to provide new and improved timing means in a static relay.

Another object of this invention is to provide control systems in a static relay that enable a wide selection and variety of switching characteristics.

Another object of this invention is to provide static relays having adjustable controls enabling use in different applications.

Another object of this invention is to provide static relays that produce switching characteristics that can be accurately controlled over a wide range.

Advantages and other objects of this invention will appear from the following detailed description:

Figure 1:
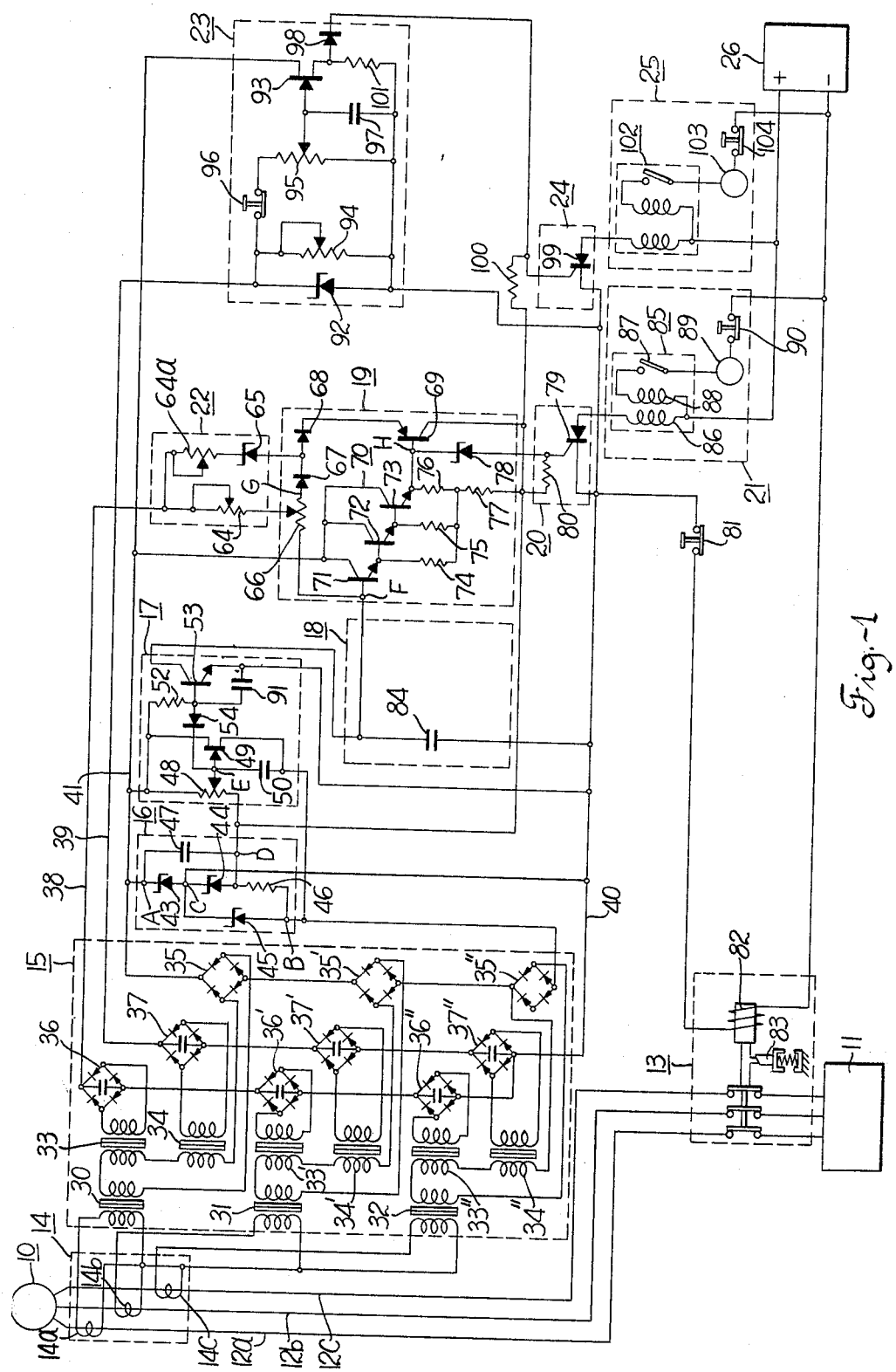
FIG. 1 is a schematic of a static relay embodying this invention.

Referring to FIG. 1, a power source 10 supplies alternating current for powering a load 11 along power lines 12a, 12b and 12c. A means for interrupting the circuit between power source 10 and load 11, such as circuit breaker 13, is provided.

A current transforming means 14 is used as a current generator means and comprises such as current transformer 14a, 14b and 14c. The current transformers transform the electrical current along each of lines 12a, 12b, 12c into a current source at their secondary windings.

The current generator output from the transforming means 14 is fed into overcurrent sensing means 15 which also comprises a means for furnishing the electrical power necessary for operating the static relay.

Overcurrent sensing means 15 is connected to furnish current to a power regulating means 16. The power regulating means furnishes the necessary potentials and current for the operation of the other components making up the static relay.

Overcurrent sensing means 15 also supplies the necessary power for a pickup control means 17 which is connected to control a timing circuit 18.

In the event of an overcurrent, the timing circuit produces an appropriately controlled output, in a manner that will be later explained, to a timing control circuit 19 which operates to deliver a signal to a time switching means 20. The time switching means responds to the output of the timing control circuit to actuate circuit breaker 13 and interrupt the power to the load. The time switching means also operates to activate a time indicating means 21, which may comprise a light 89 that visually indicates that the time switching means has operated.

A signal limiting device 22 is connected between overcurrent sensing means 15 and timing circuit 18 and control circuit 19 to give an additional means, as will be explained later, for controlling the signal to time switching means 20.

Overcurrent sensing means 15 also provides an input into an instantaneous control circuit 23 which operates to trip the circuit breaker to disconnect the load when a predetermined overcurrent level is attained. The instantaneous control circuit passes a signal to instantaneous switching means 24, which operates in a manner similar to that of time switching means 20, to interrupt the circuit and to operate an instantaneous indicating means 25.

A power source, such as direct current power source 26, is provided to furnish the power for circuit breaker 13, time indicating means 21, and instantaneous indicating means 25.

Referring more particularly to FIG. 1, transforming means 14 comprises current transformers 14a, 14b and 14c which are connected to transform an electrical current flowing through power lines 12a, 12b and 12c, respectively. These current transformers are commonly connected at one terminal, as well known in the art, to supply a current that does not significantly vary in dependence on the impedances present as a load to overcurrent sensing device 15. These currents are proportional to the current in power lines 12a, 12b and 12c. The overcurrent sensing device has three current transformers 30, 31 and 32 connected to receive the outputs of the current transformers 14a, 14b and 14c, respectively. Current transformers 30, 31 and 32 are each connected to produce a current output that is delivered to a second group of current transformers or other loads. Since each of the transformers 30, 31 and 32 are similarly connected to their respective second group of transformers and loads, only the connections to current transformer 30 will be recited.

The secondary of current transformer 30 is connected in series with a time current transformer 33, an instantaneous current transformer 34 and a power rectifying bridge 35. Depending on the design of the subsequent circuits in the static relay, the transformers could be combined to furnish all the signals and the power for the operation of the circuits; or they could be connected in any combination known in the art to furnish the particular power and signal requirements of the subsequent circuits.

In the embodiment shown, time current transformer 33 and instantaneous current transformer 34 are utilized to furnish the required current characteristics for the operation of their respective circuits. That is, the current requirements are determined by the circuit design and transformers are used to furnish these current requirements. The power supplying bridge 35 is directly connected to the secondary winding of the current transformer 30 because its power requirements are met by the output of the secondary of current transformer 30.

Power supply rectifying bridge 35, time rectifying bridge 36 and instantaneous rectifying bridge 37 are constructed and operate in a manner well known in the art to rectify and filter the alternating current produced by their respective transformers.

Current transformers 31 and 32 have similar following components and these components are given similar reference characters relative to the components following current transformer 30.

In order to sense an overcurrent in any one, or any combination, of the phases, the bridges of each respective current transformer output are connected in series. By utilizing a current source and by connecting the bridges in series, the current output will be proportional to the current in the phase having the greatest amount of current flowing. Thus, the highest current present in any of the phases will determine the operation of the relay.

Overcurrent sensing device 15 produces a time sensing output along time line 38 from the series connection of rectifying bridges 36, 36′, and 36″. Similarly, an instantaneous sensing output is produced along instantaneous line 39 from the series connection of rectifying bridges 37, 37′, and 37″. One side of the series circuit of the time rectifying bridges and the instantaneous rectifying bridges are connected in common at line 40 to furnish a common negative point for the time signal and the instantaneous signal.

Power supplying bridges 35, 35′, and 35″ are similarly connected in series to supply the power necessary in the circuitry along a power line 41 and a power negative line 42, and to supply current for utilization in pickup control means 17, as will be later explained.

Overcurrent sensing device 15 produces a D.C. output along time line 38, instantaneous line 39, and power line 41 that varies as a function of the largest current through any of lines 12a, 12b or 12c and, therefore, indicates when the current in any line exceeds a predetermined level. Since the current to the load is conducted along power lines 12a, 12b and 12c, the subsequent circuits are adjusted, as later explained, not to respond to the output of the overcurrent sensing device when a predetermined amount of current is being supplied. However, if any of the power lines develops a short, or other similar fault, the higher current through that line will create a higher output from overcurrent sensing device that will be sensed in the following circuitry and eventually effect tripping of circuit breaker 13.

The output of the power supply bridges is conducted along power line 41 to power regulating means 16 at point A. The power negative line 42 is connected to the power regulating means at point B and common negative line 40 is connected to point C. Zener diodes 43, 44, 45 are connected as shown to furnish the appropriate potentials at points A, B, C and D. A resistor 46 is connected in series with zener diode 44 to create a potential between points D and B. This potential will increase as the current source increases to a design level. Zener diode 45 limits the maximum potential that will appear across resistor 46.

The potential at point A will be most positive, the potential at point C more negative than point A, and the potential at point D most negative.

A filter capacitor 47 is connected between points A and D of the power regulator to filter the output.

The output potential supplied at point D is furnished to pickup control means 17 at the lower leg of potentiometer 48. When the current flowing in line 41 produces a sufficient potential across resistor 46, the potential at point E increases until a unijunction transistor 49 turns on. By adjusting the potentiometer arm the turn on point of unijunction transistor 49 may be controlled. When unijunction transistor 49 turns on point E, the emitter of unijunction transistor 49, assumes the potential of the lower potential base of the unijunction transistor, i.e., power negative line 42. This lowered potential forward biases diode 54 and allows capacitor 91 to discharge through diode 54 and unijunction transistor 49 to negative line 42. The discharge of capacitor 91 places the base of a transistor 53 at a negative potential relative to its emitter and thereby biases transistor 53 to turn it off. Capacitor 91 will charge through resistor 52 when unijunction transistor 49 is turned off. The rate of charge is such that transistor 53 will not be turned off unless unijunction transistor 49 is turned on. A capacitor 50 keeps unijunction transistor 49 turned on for a selected delay period.

Therefore, transistor 53 remains on until a predetermined voltage level appears at point E. At this point transistor 53 turns off and will remain off until the potential at point E becomes sufficiently low to turn off unijunction transistor 49 and thereby turn on transistor 53.

The emitter of transistor 53 is connected to negative line 40 and the collector of transistor 53 is connected to timing circuit 18. The conduction between the collector and emitter of transistor 53 effectively shorts out timing circuit 18. Thus, until the potential at point D is high enough to turn off transistor 53, timing circuit 18 will not operate. When transistor 53 turns off timing circuit 18 will be allowed to function.

Figure 2:
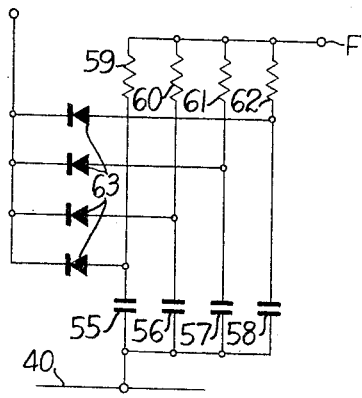
FIG. 2 is a schematic of a timing circuit that may be substituted for the timing circuit shown in FIG. 1.

The timing circuit design is determined by the time-current characteristics that will be applied to open circuit breaker 13. Timing circuit 18 may consist of a single capacitor 84, as shown in FIG. 1, or it may consist of various combinations of capacitors, resistors and diodes as shown in FIG. 2. The selection of the circuitry used and the sizing of the capacitor determines the operating characteristics of the overcurrent relay.

Figure 3:
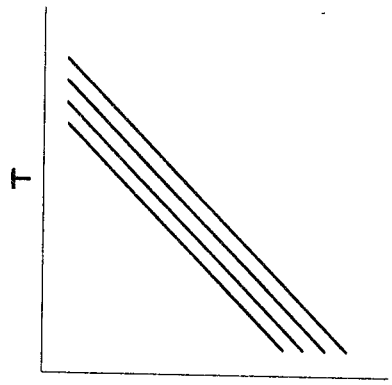
FIG. 3 is a curve of the switching characteristics relative to time and current that may be obtained with the utilization of a static relay embodying this invention.
Figure 4:
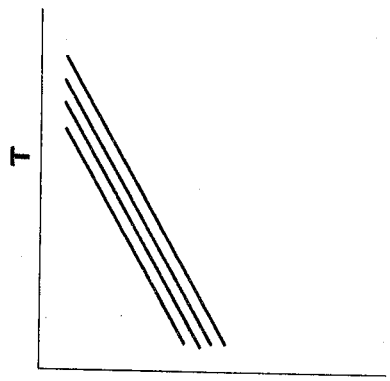
FIG. 4 is another set of curves that may be obtained with a static relay embodying this invention.

For example, when a single capacitor is used a resultant switching characteristic will be obtained that has a negative slope of one when plotted on log-log paper, as shown in FIG. 3. By utilizing various timing circuits of the general form shown in FIG. 2, the slope may be increased beyond one, as shown in FIG. 4.

FIG. 2 shows a typical embodiment of timing circuit 18 in which capacitors 55, 56, 57 and 58 are connected each in series with resistors 59, 60, 61 and 62, respectively; and the combinations are connected in parallel to form resistance-capacitance timing networks. Diodes 63 are connected in each line to isolate the individual capacitors.

In the operation of the timing circuit, an electrical current is furnished at a point F which begins charging the capacitors when transistor 53 is turned off. Capacitor 58 is of a larger capacitance than 57 and the capacitance of the capacitors 58 and 57 and 56 and 55 may progressively decrease in a manner dictated by the desired output slope of the timing circuit.

The current flowing at point F is supplied from the overcurrent sensing device along time line 38 through signal limiting device 22. Signal limiting device comprises a potentiometer 64 and a zener diode 65 connected in parallel. For purposes of explaining the current flow through point F, potentiometer 64 will be assumed to be shorted thereby effectively removing signal limiting device 22 from the circuit.

The current delivered along time line 38 from the time rectifying bridges 36, 36' and 36" charge the capacitors in timing circuit 18. If pickup control means 17 has its transistor 53 in a conducting state the current will be dissipated across the short circuit to negative line 40. With transistor 53 turned off, this current will flow to point F through part of a potentiometer 66.

Potentiometer 66 will be adjusted so that the current flow is divided to have part flow to point F and part to flow through diodes 67 and 68, through the emitter collector circuit of a transistor 69, through the zener diode 44 of power regulator 16 and back to negative line 40. Zener diode 44 has no significant resistance to this current source.

By appropriately adjusting potentiometer 66 the amount of current to timing circuit 18 may be selected while the remainder of the current is bypassed to negative line 40.

Since the current supplied at potentiometer 66 from time line 38 is a current source the voltage build-up across the capacitors of timing circuit 18 relative to time will appear as a straight line function. The utilization of current that is not significantly changed by series impedances allows the capacitors to charge at an even rate because there is relatively little effect resulting from potential increase. This is illustrated by the formula:

$$CE = IT$$

where C equals the capacitance, E equals the voltage, I equals the current flow, and T equals time. This formula shows the relationship of the charging of a capacitor to time, current and voltage. For a constant current source the voltage build-up with a given C or capacitance will be proportional to time. Therefore, the current flow through timing circuit 18 will build up to a potential at point F in a certain time that is proportional to the magnitude of current allowed to charge the capacitor network. In actual operation the amount of current delivered will be dependent on the overcurrent present in the power electrical circuit and a complex functional relationship could develop. But for the purposes of explanation of the operation it can be assumed that a constant current is being introduced. In fact, a constant current is introduced if the overcurrent is constant. To illustrate, if the current is relatively small the build-up of voltage will be relatively slower. Therefore, the relationship of the time and the current determines the time that a particular voltage will be reached at point F.

As previously mentioned, the adjustment of potentiometer 66 determines the amount of current to timing circuit 18 relative to the amount bypassed to negative line 40. The effect of this adjustment is shown by the family of curves in FIGS. 3 and 4. By moving the arm of the potentiometer the curve is moved up or down to proportionately change the overcurrent amount that will trip the circuit breaker at any given time.

In order to maintain the parallel condition of the curves shown in FIGS. 3 and 4, it is necessary to keep the current through the timing circuit and the bypass arrangement proportionately constant to each other regardless of the setting of potentiometer 66. For instance, if the right side (point G) of potentiometer 66 was directly connected to negative line 40, the bypass current would increase disproportionally to the charging current to the timing circuit. This would result because the build-up of potential across the capacitors of the timing circuit would effectively increase the impedance of the timing circuit relative to the bypass arrangement. This would alter the shape of the curves.

In order to prevent this, a means for maintaining substantially equal potential between point F and point G is provided. This means comprises such as an emitter-follower amplifier connected to receive a base potential for its first stage, transistor 71, from point F. In this embodiment the emitter-follower amplifier comprises transistors 71, 72, 73 and associated emitter resistors 74, 75, 76 and 77. The emitter-follower amplifier operates to maintain a point H at the same potential as point F. In order to compensate for the voltage drop across the base-emitter junctions of transistors 71, 72 and 73, diodes 67 and 68 are placed in the bypass circuitry. These diodes, in conjunction with the emitter base junction of a transistor 69, maintain an equal voltage drop in the paths between points F and H and between points G and H.

The potential at point H is applied to the base of transistor 69 which is operated as an amplifier. Transistor 69 is selected (components may be added for adjustment) so that its conduction resulting from the effect of its base potential (point H) results in an impedance through its collector-emitter circuit that is equal to the impedance offered by the timing circuit whatever the charge level of the capacitors may be. By utilizing this emitter-follower amplifier the charging current to the capacitors of timing circuit 18 is kept proportional to the current through the bypass arrangement so that the characteristic curve is obtained regardless of the setting of the potentiometer 66.

The potential at point F and consequently the potential at point H builds up at a rate dependent on the current flowing into the timing circuit and the charging characteristics of the timing circuit until potential exceeds the breakdown voltage of a zener diode 78. When this occurs current flows from point H through zener diode 78 into time switching means 20. This potential is applied to the gating terminal of a controlled rectifier, such as silicon controlled rectifier 79, and causes silicon controlled rectifier 79 to turn on. A resistor 80 is connected between the gating terminal of silicon controlled rectifier 79 and point D to give a potential drop between point H and point D. Point D is connected to power negative line 40 through a diode 44. When silicon controlled rectifier 79 is on it also completes a circuit to turn off unijunction transistor 49 and thereby turns on transistor 53 which discharges the timing circuit. The relay will not function until silicon controlled rectifier 79 is turned off to place the relay in a ready condition.

When silicon controlled rectifier 79 is turned on it completes a circuit from a positive terminal of power source 26, through time indicating means 21, through a normally closed switch 81, through a tripping coil 82 and a circuit breaker 13, and back to the negative terminal of power supply 26. Once the silicon controlled rectifier fires it will continue conducting regardless of the potential at its gating terminal. In order to break the circuit and turn off the silicon controlled rectifier normally closed switch 81 is provided. After a fault has been corrected so that the gating terminal is not positive, momentarily opening of switch 81 will turn off the silicon controlled rectifier. Switch 81 is normally immediately returned to its closed position. Switch 81 may be manually operated or it may be automatically responsive to predetermined conditions in other circuitry.

Circuit breaker 13 has a latch 83 which holds the circuit breaker open when the circuit breaker opens the main power lines 12a, 12b, 12c. This latch maintains the open position of the contacts until released, either manually or by some automatic means.

When silicon controlled rectifier 79 turns on current is also conducted from the positive terminal of power source 26 through time indicating means 21. Time indicating means comprises a holding relay 85 which is activated by the current flowing through a trip coil 86. When trip coil 86 is energized it closes the switch contacts 87 which energizes the holding coil 88 to turn on some indicating means, such as a light 89, which will remain on even if the fault is removed and the circuit breaker is closed. Therefore, the light will indicate that a fault has occurred even though the system may have operated to restore the supply of power to load 11. That is, if an automatically operating system is utilized the light 89 will indicate that at some time in the past a fault had occurred that caused the time circuit of the relay to function. To turn off the light a manually operated normally closed switch 90 is inserted between the power source and the light and holding relay.

In the operation of the relay, when the current out of the overcurrent sensing device 15 at lines 38 and 41 becomes excessive, that is, reaches an undesirable level, transistor 53 is caused to become nonconductive because of the effect of the overcurrent at line 41 on potentiometer 48. When transistor 53 becomes nonconductive it no longer shorts out the timing circuit 18 and thereby allows potential to build up across the timing circuit. This potential build-up is controlled by the adjustment of potentiometer 66 to give a family of curves as shown in FIGS. 3 and 4. This potential is followed through an emitter-follower amplifier 70 so that potential at point H equals that of point F. When the potential at point H exceeds the breakdown voltage of zener diode 78, it fires silicon controlled rectifier 79 to activate the tripping coil of circuit breaker 13. When activating the tripping coil it also turns on, and keeps on, an indicating light showing that a fault has occurred.

As previously explained, the design of timing circuit 18 determines the slope of the time current tripping characteristic of the relay as shown in FIGS. 3 and 4. While this characteristic may be satisfactory for some installations there are many where it is not desirable to deenergize the load by a timing function if it is excesive only for a short period of time. In order to accomplish this and still maintain the desired curve at longer periods of time, signal limiting means 22 is interposed between the current delivered along time line 38 and timing control circulit 19. Also signal limiting means can be used to vary the slope of the curves by approprate selection and adjustment of its components. In the foregoing description of the circuitry potentiometer 64 of signal limiting device 22 was considered shorted and, therefore, effectively eliminated signal limiting device 22 from the circuit.

Figure 5:
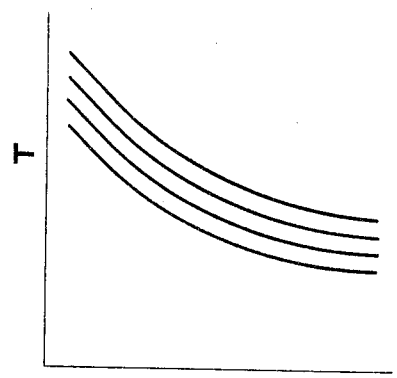
FIG. 5 is another set of curves that may be obtained with a static relay embodying this invention.

When it is desired to prevent tripping of the circuit breaker when large overcurrents appear for short periods of time and still maintain a desired time-current tripping curve at longer periods of time or to alter the shape of the curves between a negative slope of zero and one, signal limiting means 22 is utilized. The effect of signal limiting means 22 is to limit the amount of current flowing into potentiometer 66 and thereby limit the current flowing to timing circuit 18. If the current exceeds a certain level the potential developed across zener diode 65 will exceed its breakdown voltage and the excess current will be bypassed through the bypass arrangement to negative line 40. By adjusting potentiometer 64 the proportion of current between the parallel circuits of the potentiometer 64 and zener diode 65 may be controlled to vary the level of current that will be bypassed. The excess current is bypassed through zener diode 65 and transistor 69. When this occurs the timing circuit continues to charge but not at a rate reflecting the high input current. Instead it charges at a maximum rate dictated by the breakdown voltage of zener diode 65 and the setting of potentiometer 64. In this manner the maximum chargeable rate of timing circuit 18 is controlled and a definite minimum time of charging is required, irrespective of the amount of current flow, to trip the relay. Thus, transient high currents of short duration will not cause the timing circuit to rapidly reach a tripping level. The effect of the signal limiting device is shown in FIG. 5 on the portion of the curves that are asymptotic to some line parallel to the current (I) axis. This shows that at a certain minimum time the amount of current will not effect the tripping characteristic to increase the rate of charging of the capacitors. By adjustment of potentiometer 64 the point of flattening the curve may be varied.

Figure 6:
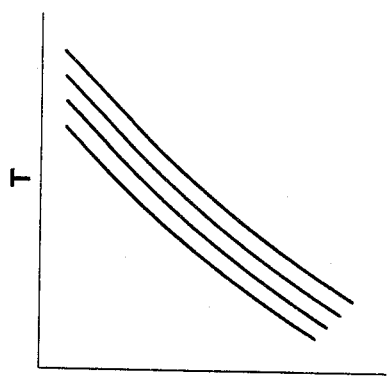
FIG. 6 is another set of curves that may be obtained with a static relay embodying this invention.

To alter the curve characteristics to obtain a slope between zero and one, a resistor 64a is inserted in series with zener diode 65. FIG. 6 shows a curve that could be obtained by the use of such a resistor. Thus, by selection and adjustment of components the basic curves shown in FIGS. 3 and 4 may be altered to curves similar to those shown in FIGS. 5 and 6.

It is often desirable to immediately trip out the circuit breaker when the overcurrent reaches a very high level independent of the time that it remains at that level. To accomplish this an instantaneous control circuit 23 is provided that receives its input along instantaneous line 39. This overcurrent condition could be applied, for example, in conjunction with signal limiting means 22 so that instantaneous current surges will not trip the circuit breaker unless they exceed a certain amount. This amount may be responded to by instantaneous control circuit 23.

Instantaneous control circuit comprises a zener diode 92 which functions to bypass excessive current that could damage the components of the rest of the instantaneous time control circuit. The instantaneous signal is received along instantaneous line 39 and eventually acts on the emitter of a unijunction transistor 93. The signal is passed through potentiometers 94 and 95 which are adjusted for a specific level of current that will turn on unijunction transistor 93. Thus, the level of current that will produce a sufficient voltage to turn on unijunction 93 is adjustable through one of the potentiometers. In actual practice, one of the potentiometers would be a trimming resistor to adjust for the components and the other would be a dial setting that could be utilized to change the current level that would trip the instantaneous relay. A switch 96 is provided to make the instantaneous circuit inoperative if it is not necessary for the particular application.

When the potential at the emitter of unijunction transistor 93 reaches a certain positive value, the unijunction transistor is rendered conductive. Capacitor 97 cooperates with the lower leg of potentiometer 95 to maintain the voltage for a sufficiently long time to furnish the potential to turn on instantaneous switching means 24. When the potential is sufficiently high and unijunction transistor 93 turns on, the positive pulse is conducted from the emitter of the unijunction transistor to its collector base (the lower base) and the positive pulse is conducted through a diode 98 to the gating terminal of a silicon controlled rectifier 99 in instantaneous switching means 24. The positive potential from the unijunction transistor causes silicon controlled rectifier 99 to turn on in an identical manner to that described for time switch means 20. The positive potential appears across a resistor 100 in instantaneous switching means 24. A resistor 101 is connected between the base of transistor 93 and negative line 40 to maintain the potential of the positive pulse appearing at the base of the transistor. Diode 98 is interposed between the transistor and the silicon controlled rectifier to maintain the silicon controlled rectifier in a negative bias condition so that inadvertent firing of the silicon controlled rectifier will not occur.

The firing of the silicon controlled rectifier activates trip coil 82 to open the circuit breaker in a manner identical to that of the operation of silicon controlled rectifier 79 in time switching means 20. Also in an identical manner, the switching on of silicon controlled rectifier 99 activates a holding relay 102 which turns on an instantaneous indicating light 103 in the same manner and with the same effect as with the operation of indicating light 89 for the time indicating circuit. The instantaneous light 103 will also remain on until a manually operated switch 104 is opened to release the holding relay.

As explained, when an overcurrent exists in the power lines furnishing load 11, the overcurrent is sensed by the timing circuitry and by the instantaneous circuitry. If the current is at a point where it is desirable to have the circuit breaker trip, the instantaneous circuit will operate to fire silicon controlled rectifier 99 and activate trip coil 82 to open the circuit breaker. If the overcurrent is less than this said amount but is high enough to render transistor 53 (in pickup control means 17) nonconductive, a current will be delivered to timing circuit 18, the turning on of silicon controlled rectifier 79 to open the circuit breaker will be determined by the time-current level of the overcurrent. This is affected by two factors. The first is the characteristic of timing circuit 18 and the second is the characteristic of signal limiting means 22. Timing circuit 18 determines the time-current slope as shown in FIGS. 3 and 4 and signal limiting means 22 determines a minimum time at which any amount of excess current will not increase the rate of change of the timing circuit and may be used to alter even further the time-current curves, as shown in FIGS. 5 and 6.

By appropriate selection of components and proper adjustment, the overcurrent sensing relay described can be used in almost any application. In actual practice, the components are selected and the static relay utilized so that adjustment of potentiometer 64 in signal limiting means 22, potentiometer 66 in timing control circuit 19, and potentiometer 95 in instantaneous control circuit 23 are adjustable to give any desired time-current tripping characteristics. With these adjustments a slope from almost zero to at least three having varying function characteristics relative to the time and current may be selected. The minimum time for the operation of the timing circuit, that is, the minimum overcurrent that will start operation of the timing circuit is determined by the adjustment of potentiometer 48 in pickup control means 17.

It is readily seen that the described embodiment of this invention could take many forms and modifications known in the art. It is apparent that there are many modifications and variations of the above that are within the spirit of the invention.

The embodiments of the invention in which an exclusive property or privilege is claimed are defined as follows:

1. A control circuit responsive to a varying electrical input to produce a signal at predetermined time-current levels of the input, said control circuit comprising: storage means connected to receive the input for storing energy received from the input; a bypass circuit connected parallel to the storage means; a potentiometer connected to adjust the portion of the input passed to the storage means relative to the portion of the input passed to the bypass circuit; said bypass circuit comprising the emitter-collector circuit of a transistor; an emitter-follower amplifier connected to maintain the potential across the bypass circuit equal to the potential across the storage means, said transistor and components selected whereby the impedance in the bypass circuit is maintained equal to the impedance across the storage means; and means for producing the signal at a predetermined level of energy stored by the storage means.

2. A control system responsive to current in a polyphase electrical circuit to produce a signal, said control system comprising: current transformers each having its primary winding connected to a different phase and having the outputs from its secondary windings connected in series to produce an output varying as a function of the highest current of any phase; storage means connected to receive the output for storing energy from the output as a voltage; a bypass circuit connected parallel to the storage means; a potentiometer connected to adjust the portion of the input passed to the storage means relative to the portion of the input passed to the bypass circuit; said bypass circuit comprising the emitter-collector circuit of a transistor; an emitter-follower amplifier connected to maintain the potential across the bypass circuit equal to the potential across the storage means, said transistor and components selected whereby the impedance in the bypass circuit is maintained equal to the impedance across the storage means; a silicon controlled rectifier connected to control the switching circuit; a zener diode connected in series with the gating terminal of the silicon controlled rectifier and connected in parallel with the storage means to turn on the silicon controlled rectifier when the voltage across the storage means exceeds a predetermined level; a transistor connected to receive a function of the output and having its emitter-collector circuit in parallel with the storage means, said transistor biased and controlled to remain in a conductive state when the output is below a predetermined level and to assume a nonconductive state when the output is above a predetermined level; a circuit connected in series with the current generating means, said last circuit comprising a zener diode connected in parallel with a variable resistance and in series with a variable resistance.

3. A control circuit responsive to a varying electrical input to produce a signal at predetermined time-current levels of the input, said control circuit comprising: storage means connected to receive the input for storing energy received from the input; a bypass circuit connected parallel to the storage means; means connected to adjust the portion of the input passed to the storage means relative to the portion of the input passed to the bypass circuit; means connected to maintain the potential across the bypass circuit equal to the potential across the storage means; and means for producing the signal at a predetermined level of energy stored by the storage means.

References Cited by the Examiner

UNITED STATES PATENTS

| | | | |
|---|---|---|---|
| 3,018,356 | 1/1962 | Busch et al. | 317—33 X |
| 3,153,747 | 10/1964 | Sofianek et al. | 317—36 |
| 3,157,825 | 11/1964 | Antoszewski et al. | 317—36 |
| 3,201,651 | 8/1965 | Calhoun | 317—36 |

MILTON O. HIRSHFIELD, *Primary Examiner.*

SAMUEL BERNSTEIN, *Examiner.*

J. D. TRAMMELL, *Assistant Examiner.*